(12) United States Patent
Desai et al.

(10) Patent No.: US 9,763,173 B2
(45) Date of Patent: Sep. 12, 2017

(54) REGULATORY DOMAIN IDENTIFICATION FOR NETWORK DEVICES

(71) Applicant: CISCO TECHNOLOGY, INC., San Jose, CA (US)

(72) Inventors: Vishal Desai, Santa Clara, CA (US); Jim Nicholson, Akron, OH (US); David Case, North Canton, OH (US); Sangita Mahishi, Danville, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 139 days.

(21) Appl. No.: 14/156,165

(22) Filed: Jan. 15, 2014

(65) Prior Publication Data
US 2015/0201370 A1    Jul. 16, 2015

(51) Int. Cl.
*H04W 48/16* (2009.01)
*H04W 8/24* (2009.01)

(52) U.S. Cl.
CPC ........... *H04W 48/16* (2013.01); *H04W 8/245* (2013.01)

(58) Field of Classification Search
CPC .............................. H04W 48/16; H04W 8/245
See application file for complete search history.

(56) References Cited

U.S. PATENT DOCUMENTS

| 9,398,471 | B2 * | 7/2016 | Iyer ....................... H04W 24/02 |
| 2007/0180509 | A1 * | 8/2007 | Swartz .................. G06F 9/4406 726/9 |
| 2009/0067398 | A1 | 3/2009 | Green et al. |
| 2009/0129291 | A1 | 5/2009 | Gupta et al. |
| 2012/0052876 | A1 | 3/2012 | Anderson et al. |
| 2012/0258670 | A1 * | 10/2012 | Gossain ................. H04B 17/27 455/67.11 |
| 2013/0198347 | A1 * | 8/2013 | McKinstry .............. H04L 41/00 709/220 |

FOREIGN PATENT DOCUMENTS

| EP | 1560451 | 8/2005 |
| FR | 2907290 | 4/2008 |

OTHER PUBLICATIONS

International Search Report and Written Opinion for International Application No. PCT/US2015/010670, mailed Apr. 28, 2015.

\* cited by examiner

*Primary Examiner* — Hoon J Chung
*Assistant Examiner* — Zhensheng Zhang
(74) *Attorney, Agent, or Firm* — Polsinelli PC

(57) ABSTRACT

Approaches are described for configuring a wireless network device, such as an access point, with appropriate configurations such that the device is operable in one or more country and/or regulatory domains. At least some embodiments enable the configuration process to operate in an automatic configuration mode, wherein at least one of a plurality of access points can be configured to automatically obtain and apply regulatory domain and country configurations to operate in a particular regulatory domain. Other approaches provide for configuring an access point based on a manual configuration approach, wherein a portable computing device can be used to configured the access point to operate in a particular regulatory domain.

20 Claims, 9 Drawing Sheets

REGULATORY DOMAIN IDENTIFICATION FOR NETWORK DEVICES

FIELD OF INVENTION

Embodiments of the present invention are generally related to computer systems and networking devices, and are particularly related to systems and methods for the management of wireless networking devices.

BACKGROUND

Many countries have regulatory requirements for wireless network devices such as access points or other wireless devices. This requires diligence on behalf of a manufacturer of such devices to ensure that the devices are configured with appropriate regulatory domain and country configurations such as operational channel and allowed power levels. Further, device manufactures are tasked with ensuring the integrity of such devices. For example manufacturers may be required to limit the ability of customers or end users to configure or otherwise operate their equipment to ensure that the devices will not operate outside of local regulations and restrictions. Thus, to comply with local requirements, manufacturers may pre-configure such devices based on the regulatory domain and/or country of destination. To accommodate this, manufacturers define different stock keeping units (SKUs) for each regulatory domain and/or country. However, this can lead to extra expense in the manufacturing and direct fulfillment (DF) processes.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
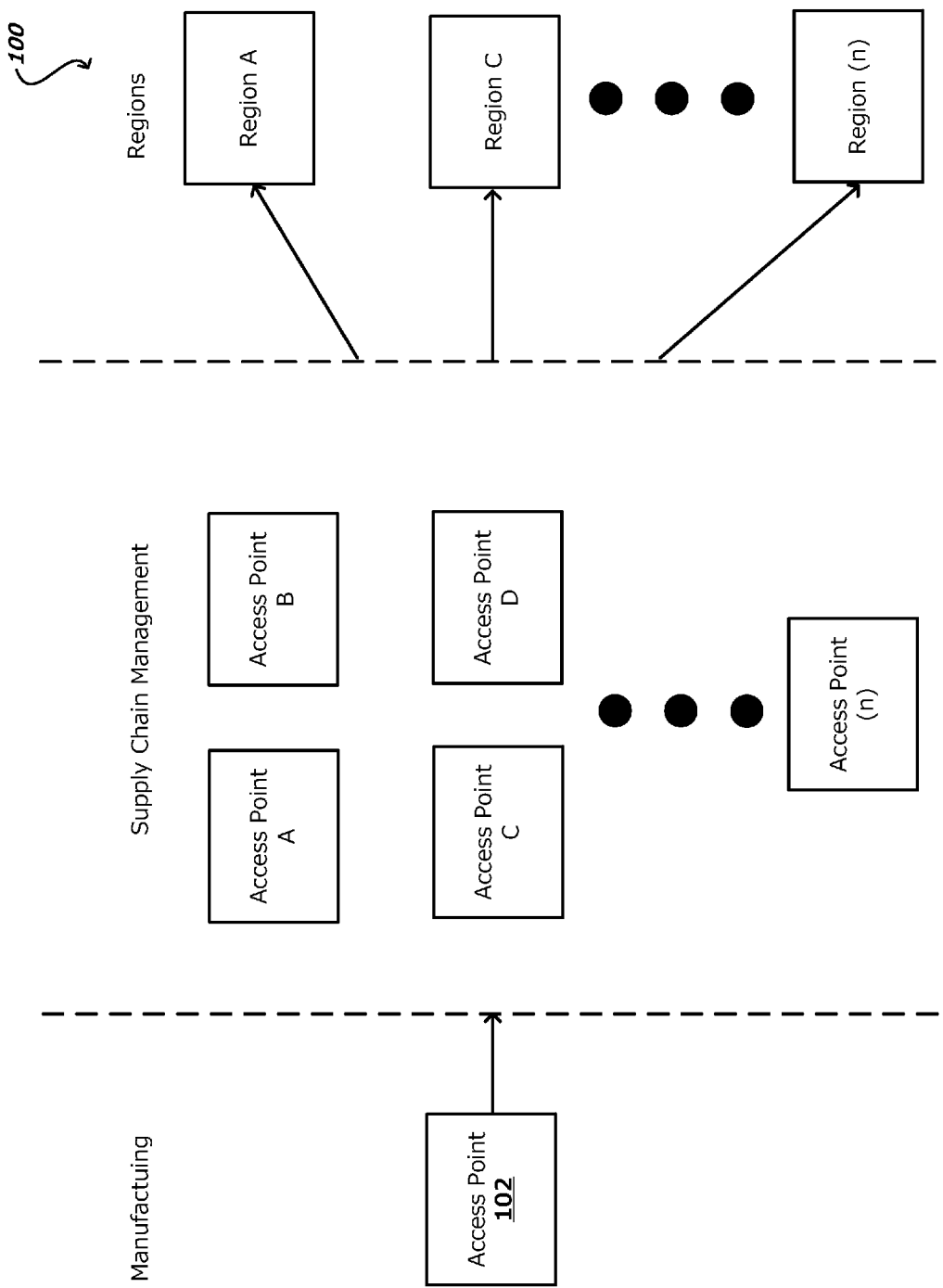
FIG. 1 illustrates an example situation of providing a network device to a plurality of different regulatory domains in accordance with an embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Approaches in accordance with various embodiments of the present disclosure may overcome one or more of the aforementioned and other deficiencies experienced in conventional approaches to managing wireless network devices. In particular, described herein are systems, devices, computer-readable media, and methods for automatically configuring a wireless network device, such as an access point, with appropriate configurations such that the device is operable in one or more regulatory domains and/or countries. At least some embodiments enable the configuration process to operate in one of an automatic configuration mode or a manual configuration mode. For example, an automatic configuration mode can be activated on a computing device, where in response to activating the automatic configuration mode, a connection between the computing device and one of a plurality of network devices can be detected. In certain embodiments, the one of the plurality of network devices is within a detection range relative to the computing device. Configuration information is obtained from the one of the plurality of network devices, where the configuration information is operable to configure the computing device to operate in at least one geographic area. In certain embodiments, the configuration information can be stored for use in configuring at least one other network device.

In various embodiments, in an automatic configuration approach, at least one of a plurality of access points can obtain and apply regulatory domain and country configurations to at least one other wireless network device. For example, a plurality of wireless network devices can be configured to communicate and/or otherwise be discoverable across at least one network such as a peer-to-peer network, wireless network, or other network. In various embodiments the network can include at least some level of secure communication protocols. In at least one embodiment, a universal access point can attempt to obtain information useful in determining regulatory domain and country configuration information from at least one device (e.g., a secure access point, universal access point, wireless device, etc.). The obtained configuration information can be verified using various approaches and the verified configuration can be used to configure the universal access point such that the access point is operable in a particular regulatory domain or country. In various embodiments, such approaches can be automatically performed each time the device is powered on, after a determined interval of time, in response to detecting at least one domain configuration change, or at another appropriate time.

In accordance with various other embodiments, if configuration fails using the automatic approach, or for some other reason, the universal access point can implement at least one manual configuration approach. In a manual approach, a portable computing device (e.g., a mobile phone, table computer, wearable computer, etc.) can be used to configure the universal access point. For example, the portable computing device can determine its location and based at least in part on its location can determine regulatory domain and country configurations. Thereafter, the portable computing device or other network device can establish a connection with the universal access point to configure the universal access point or other device to operate in a respective regulatory domain or country.

Various other functions and advantages are described and suggested below as may be provided in accordance with the various embodiments.

As described, in conventional approaches, because countries have regulatory requirements for wireless devices such as wireless access points and other wireless network devices, manufacturers have to take extra care to ensure that such devices are configured with appropriate regulatory domain and country configurations. Further, device manufactures have to ensure the integrity of such devices by implementing various approaches to limit the ability of customers or end users to manually configure such devices to ensure that the devices will not operate outside of local regulations and restrictions. Accordingly, to comply with these restrictions, manufacturers pre-configure equipment based on the country of destination of these devices. However, this leads to extra expense in the manufacturing and direct fulfillment (DF) processes. For example, as shown in example 100 of FIG. 1, a wireless network device, such as a wireless access point 102 is to be distributed to a number of different regulatory domains and/or countries. As described, based at least in part on the regulatory domain and/or country, the access point may need to be configured with appropriate regulatory domain and country configurations. Example regulatory domain and country configurations can include operational channels, allowed power levels, as well as various other configurations. Accordingly, a device manufacturer that manufactures devices for regions having different operation requirements may have to preconfigure each device for an appropriate region. As shown in FIG. 1, this may require a device manufacture to have to manufacture a number of different preconfigured wireless access points (e.g., wireless access points A-(n)), where each wireless access point is preconfigured to operate in a particular region (e.g., one of regions A-(n)). It should be noted that any number of access points, 'n', and/or any number of regions, 'n', are possible and the example access points and regions are for merely for illustrative purposes. However, as more and more regulatory domains are supported, this can require a large number of possible permutations for any one wireless access point, resulting in unnecessary costs and expense. Further, a user of such devices would be limited to the region in which the device can be used since each device is preconfigured for one region. This can be frustrating to users who may require to operate such devices in multiple regions. Accordingly, in accordance with various embodiments, systems and methods provide for configuring a wireless network device with appropriate configurations such that the device is operable in one or more regulatory domains and/or countries using at least one of an automatic or manual configuration approach.

Figure 2:
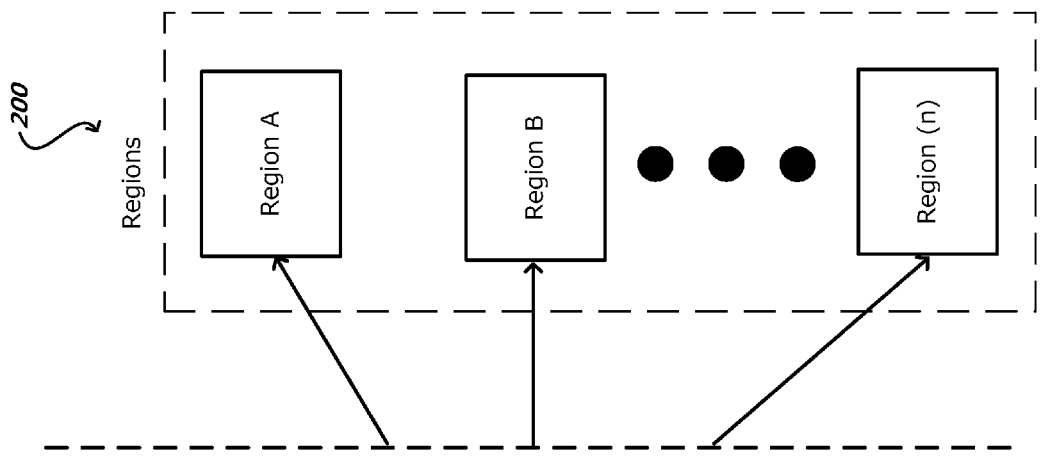
FIG. 2 illustrates an example situation of providing a network device to a plurality of different regulatory domains in accordance with an alternate embodiment.
Figure 2:
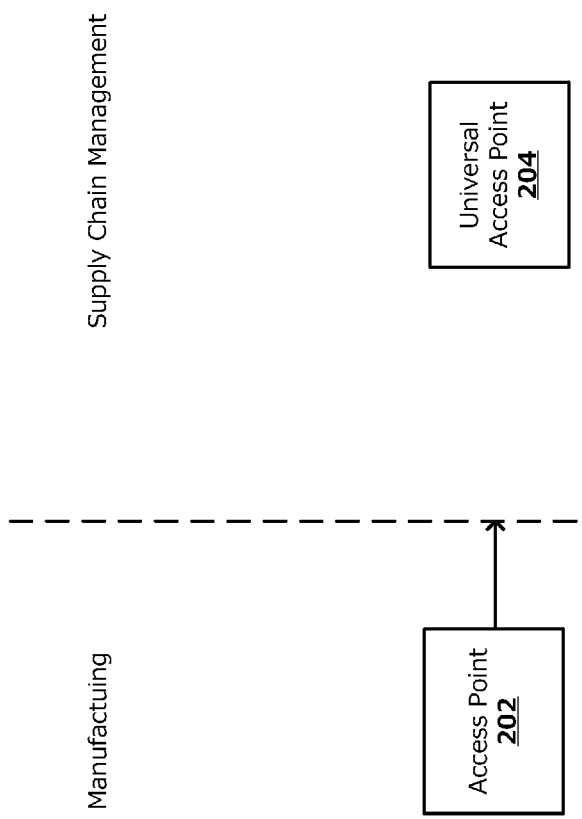

For example, as shown in example 200 of FIG. 2, a wireless access point 202 can be configured to operate as a universal access point 204. In accordance with various embodiments, a universal access point can be configured to operate in one or more regulatory domains and/or countries. The universal access point can be wireless and/or a wired access point. Similarly, access points and other network devices described herein can be wireless or wired devices and the embodiments and approaches described herein can be modified and/or are otherwise applicable. In various embodiments, the universal access point can automatically be configured with appropriate regulatory domain and country configurations such that the universal access point is operable in one or more regulatory domains and/or countries. This can include, for example, causing the universal access point to be configured using at least one of an automatic configuration approach or a manual configuration approach. In this way, the universal access point can be configured to operate in at least one regulatory domain and/or country and is not tied to a particular region. Various automatic and manual configuration approaches can be implemented to configure such devices, as will be described herein. Further, in various embodiments, the universal access point can be used to configure one or more other wireless access points or other wireless network devices. In certain embodiments, approaches provide for secure configuration of such devices, where configuration approaches are designed to comply with various regulatory agencies.

Figure 3:
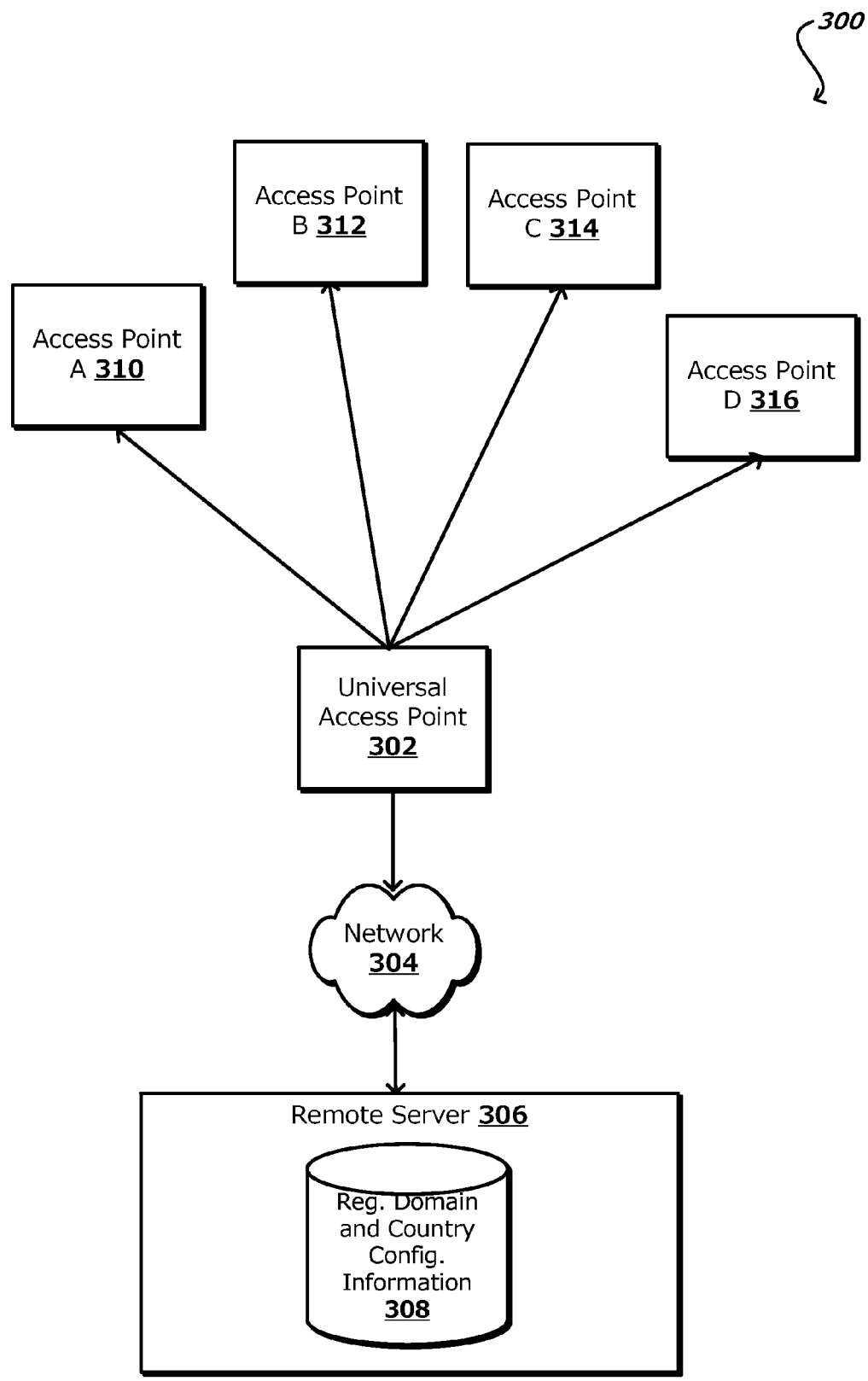
FIG. 3 illustrates an example of automatically configuring at least one network device to be operable in a regulatory region that can also be used to configure at least one other network device in accordance with various embodiments.

FIG. 3 illustrates example 300 of an automatic configuration approach of configuring at least one wireless access point or other network device to be operable in a regulatory region in accordance with various embodiments. As shown in FIG. 3, a universal access point can communicate over network 304 with a remote server 306 that is in communication with a data store 308. In accordance with various embodiments, the remote server can include any appropriate device operable to send and receive requests, messages or information over an appropriate network 304 and convey information back to a user of the universal access point. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof.

As shown, the illustrative environment includes a data store 308. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 306 can include any appropriate hardware and software for integrating with the data store 308 as needed to execute aspects of one or more applications for the universal network device and handling a majority of the data access and business logic for an application. The universal access point can communicate with a number of other wireless network devices, such as network devices 310, 312, 314, and 316. For example, the universal access point as well as the plurality of access points can include one or more wireless components operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

As described, the universal access point can implement an automatic configuration approach to cause the universal access point to be operable in a particular regulatory domain and/or country. In accordance with various embodiments, in an automatic configuration approach, the universal access point can obtain the regulatory domain and country configuration information from a data store and can apply the information to at least one of the access points. Further, the regulatory domain and country configuration information can be applied to the universal access point. For example, in at least one embodiment, the universal access point can attempt to obtain information useful in determining regulatory and country domain configuration information from the remote server and the configuration information can be verified using regulatory and country domain configuration information from at least one other access point. The information can include, for example, 802.11 beacons frames, filters, and invalid and malicious rogues from at least one of the access points. In various embodiments, a beacon frame is one of the management frames in 802.11 based WLANs and can contain all the information about the network. Beacon frames can be transmitted periodically to announce the presence of a Wireless LAN. Beacon frames can be transmitted by an access point in an infrastructure basic service set (BSS). In a BSS network, beacon generation is distributed among the stations. In accordance with an embodiment, the BSS can provide the basic building-block of an 802.11 wireless LAN. In infrastructure mode, a single access point together with all associated stations (STAs) is called a BSS; not to be confused with the coverage of an access point, known as the basic service area (BSA). The access point acts as a master to control the stations within that BSS; the simplest BSS consists of one access point and one station.

In various other embodiments, the universal access point can obtain the regulatory domain and country configuration from at least one of the access points using any or at least a subset of information associated with the access point. Thereafter, the configuration can be caused to be propagated to the rest of the access points. In various embodiments, such approaches can be automatically performed each time the device is powered on, after an determined interval of time, detecting at least one domain configuration change, or at another appropriate time. In accordance with an embodiment, the universal access point can attempt to obtain information useful in determining regulatory domain and country configuration information from at least one of the plurality of access points, where the obtained configuration information can be verified using various approaches as described further herein, and the verified configuration can be used to configure the universal access point such that the access point is operable in a particular regulatory domain or country.

Figure 4:
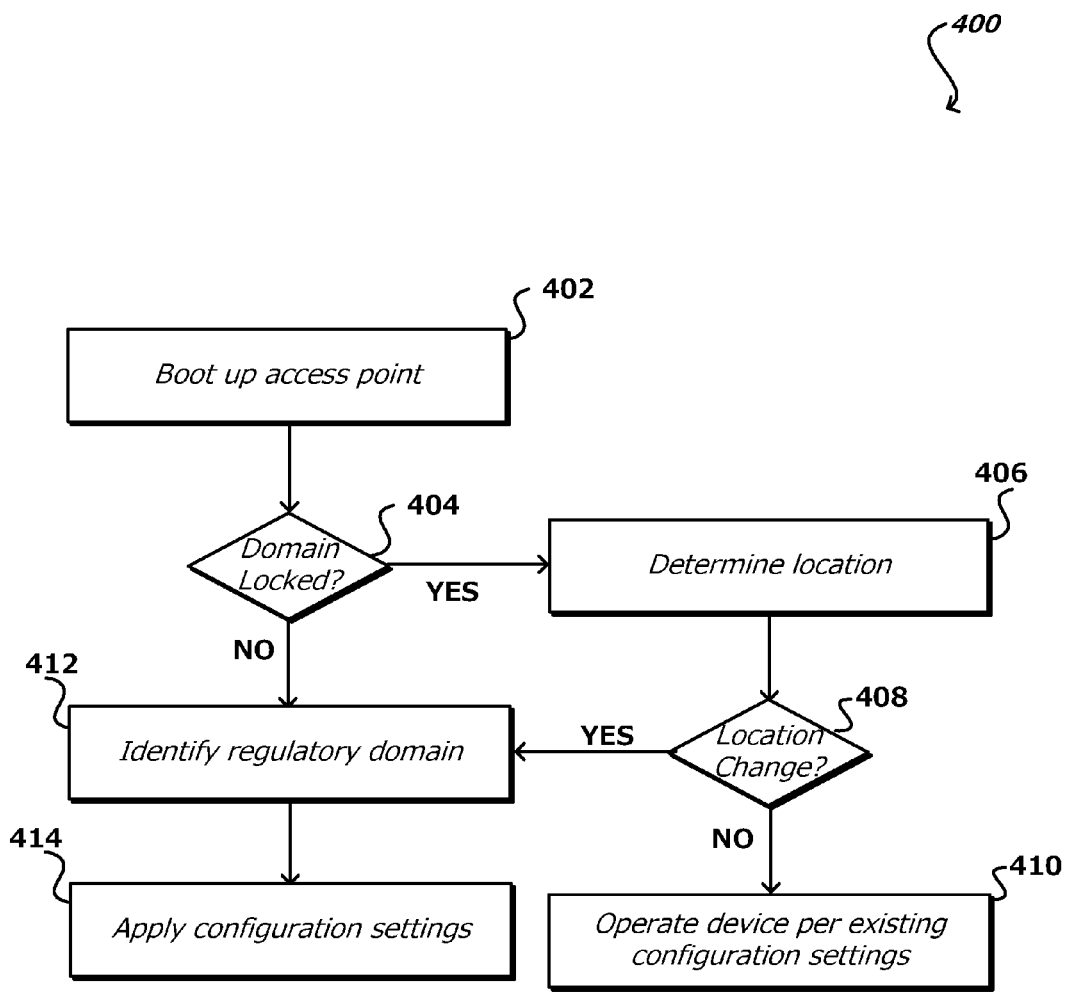
FIG. 4 illustrates an example boot up process for a network device in accordance with various embodiments.

For example, FIG. 4 illustrates an example boot up process 400 for an access point or other network device in accordance with various embodiments. It should be understood that, for various processes discussed herein, there can be additional, fewer, or alternative steps performed in similar or alternative orders, or at least partially in parallel, in accordance with the various embodiments unless otherwise stated. Further, the entire process can be performed on a single device in some embodiments, while at least portions of the process can be performed using one or more other computing devices, such as a remote server, in accordance with various embodiments. When the wireless access point is powered on or otherwise resumes operation from a low power (e.g., standby or hibernation mode) or off state, the wireless access point can enter a configuration mode, wherein when operating in the configuration mode, the wireless access point can be configured with appropriate regulatory domain and country configurations. In an example embodiment, this mode may be entered by activating a preset switch within the access point. In another example embodiment, a software command may be sent to the access point, where the access point can authenticate the source sending the command. The source sending the command may be authenticated by any suitable means such as certificates, shared (e.g., public/private) keys, and/or shared secret. In yet another example, embodiment, the mode can be automatically entered in upon resuming from the lower power and/or off state. In an example embodiment, operation of the access point can be restricted while in configuration mode. For example, the access point may be configured to send only predefined signals, such as beacons, on a predefined channel, and/or advertise a special, predefined basic service set identification (BSSID) on a predefined channel (for example 2.4 GHz).

The wireless access point can determine 404 whether the domain is locked or otherwise primed. In various embodiments, a locked or primed domain can include the situation where the domain of the access point has been previously determined. In the situation where the domain is primed/locked, at least one process can be initiated to determine 406 the location of the access point, wherein the current location can be used to determine 408 whether the location has changed compared to at least one previous location. Determining the location of the access point can include using at least one location determining component or other location/position determining component to identify a location of the access point and the determined location can be compared to a most recent stored location. In the situation where the location matches the most recent location, then the access point can resume operation using the regulatory domain and country configuration associated with that region. In various embodiments, the location can correspond to a geographic location that corresponds to at least one regulatory domain and/or country. In the situation where the domain is not primed/locked, or the user desires to reset the access point to cause the location to change or otherwise be updated, then at least one process can be initiated to identity 412 a current regulatory domain. Identifying the regulatory domain can include at least one of an automatic or manual configuration approach. In any situation, while in the configuration mode, regulatory domain and country configuration information is obtained and applied 414 such that the access point is configured to operate in an appropriate regulatory domain or country. In various embodiments, the access point can configure at least one other access point using the configuration information.

Figure 5:
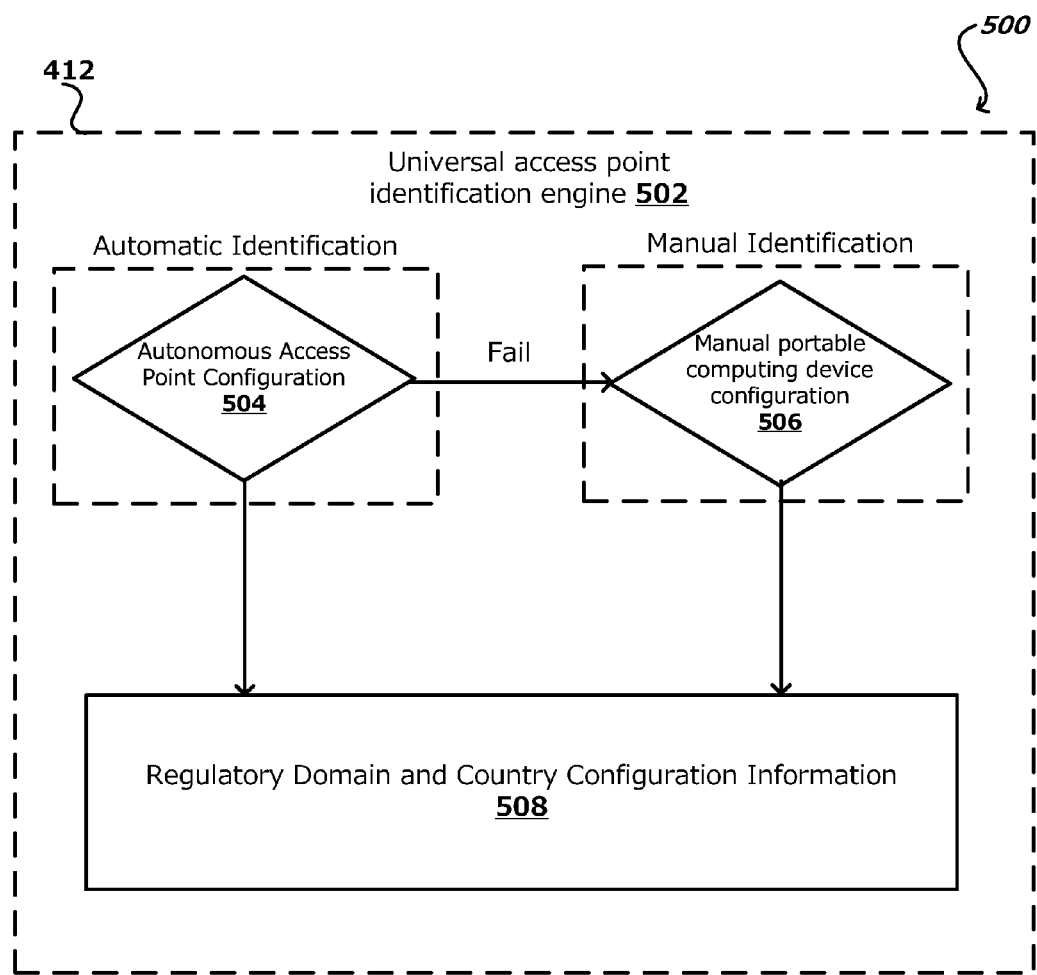
FIG. 5 illustrates an example process of implementing one of an automatic configuration approach or a manual configuration approach to configure at least one network device with appropriate configurations such that the device is operable in a regulatory domain or country.

FIG. 5 illustrates an example 500 of implementing one of an automatic configuration approach or a manual configuration approach, such as in step 412 of FIG. 4 to configure at least one access point or wireless device with appropriate configurations such that the device is operable in a regulatory domain or country. As shown in FIG. 5, a universal wireless access point 502 can implement one of an automatic configuration process 504 or an manual configuration process 506 to identify a regulatory domain and/or country to obtain the appropriate regulatory domain and/or country configuration information 508 such that the universal wireless access point is operable in the identified regulatory domain and/or country. As described, in an automatic configuration approach, the universal access point can obtain and apply regulatory domain and country configurations to configure at least one other wireless device. For example, while in a configuration mode or other such mode, regulatory domain and country configuration information can be obtained from at least one other device, such as another access point, computer, service, or system in communication with the universal access point. In particular embodiments, the universal access point can authenticate with the sending device, where authentication can be accomplished by any suitable means such as validating certificates, public/private key, shared secret, etc. In certain embodiments, information representative of the configuration information may be received from a first device and the access point can obtain the appropriate operating parameters corresponding to the regulatory domain from a second device. For example, the second device can be a remote server employed for provisioning operating data. The universal access point may be pre-configured with an address (such as an IP address) for the remote server and/or the address of the remote server may be received with the regulatory domain data. The remote server may be a public server or a private server wherein the wireless device authenticates with the server via any suitable means before obtaining the operating parameters. The operating parameters may include but are not limited to operating channels, power levels, data rates, protocols, etc.

Thereafter, the universal access point can be configured to operate in the regulatory domain. In various embodiments, a plurality of access points or other network devices can be configured to communicate and/or be discoverable across at least one network, such as a peer-to-peer network, wireless network, or other network. In this situation, the universal access point can configure at least one other access point belonging to a same group. In various embodiments, device groupings may be established by subnet domains, such as IP subnet domains, a range of IP addresses, wireless devices (such as access points) within wireless communication range, and/or wireless devices coupled to the same switch. The configuration information may be sent to the other devices wirelessly, for example on a predefined channel such as 2.4 GHz or through a network which may be wired or wireless.

In accordance with an embodiment, if configuration fails using the automatic approach, or for some other reason, the universal access point can implement at least one manual configuration approach. For example, in such an approach, a portable computing device can be used to configure the universal access point. In this way, the portable computing device can determine its location, and based at least in part on its location, can determine regulatory domain and country configurations. Thereafter, the portable computing device can establish a connection with the universal access point to configure the universal access point to operate in a respective regulatory domain.

Figure 6A:
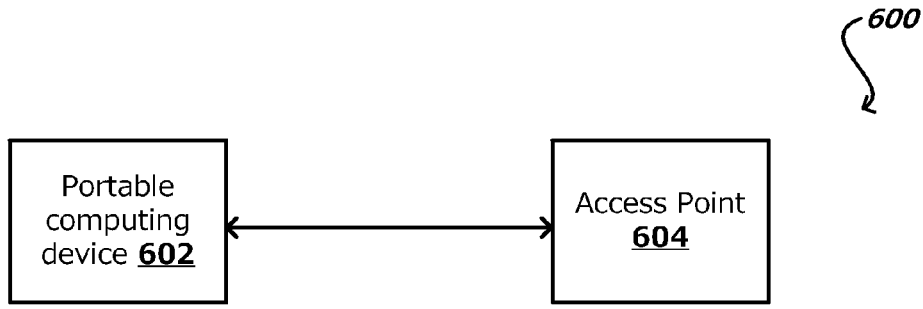
FIGS. 6A and 6B illustrate an example of configuring a plurality of network devices in accordance with various embodiments.

For example, FIG. 6A illustrates an example 600 where a portable computing device 602, such as a mobile phone, tablet, etc. is employed to configure a wireless access point 604. In accordance with various embodiments, an application, system component, or service operating on the portable computing device can implement the functionality described herein. In accordance with an embodiment, the portable computing device can include at least one location determining component or other location/positioning determining component to determine its current location, and based at least in part on the determined location, can determine or otherwise obtain the appropriate configurations such that the device can be used to configure an access point or other wireless device to operable in one or more country and/or regulatory domains. As discussed, the device in many embodiments will include at least a location determining component for determining a location of the device (or the user of the device). A location determining component can include or comprise a GPS, cellular antennae for triangulating location, wireless antennae with wireless network fingerprint, or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

The portable computing device can communicate with at least one wireless access point 604 or other wireless network device such as to configure the wireless access point to operate in the determined regulatory domain. In various embodiments, the portable computing device can communicate with the wireless access point on at least one predefined channel (e.g., a 2.4 gigahertz (GHz) channel). In certain embodiments, the portable device can authenticate with the wireless access point. This can include, for example, any suitable means for authentication, as may include a shared secret passcode, public key/private key, certificates, etc. Upon establishing communication with the access point, the portable computing device can provision the wireless access point with the appropriate regulatory domain and country configurations and appropriate operating parameters, as may include operating channels, maximum power, etc. for the regulatory domain.

In certain embodiments, the portable computing device can provision the wireless access point with the regulatory domain and the operating parameters can be obtained from a server remote from the wireless access point. In another example embodiment, the computing device can determine the regulatory domain and obtain the operating parameters from the remote server. The portable computing device can then use the operating parameters for the particular regulatory domain to provision the access point. This is advantageous in the situation where the wireless access point does not have Internet capability and the portable computing device can obtain the operating parameters via other means, such as over a mobile data network or other network. For example, if portable computing device is a mobile phone, the mobile phone can obtain the operating parameters via a cellular network. In this way, the portable computing device can determine its location and the corresponding regulatory domain and can provide the access point with appropriate configuration information.

In various embodiments, the access point can communicate via a network with at least one server. In an example embodiment, the portable computing device provides the wireless access point with an address (for example an Internet Protocol "IP" address) for the remote server. In another example embodiment, the access point is pre-configured with the address for the remote server. For example, the address of the remote server may be installed by the manufacturer of the access point. In an example embodiment, the remote server can be a publicly available server, in an alternative embodiment, the wireless access point authenticates with the remote server. The wireless access point can obtain the appropriate operating parameters for the regulatory domain from the remote server. In particular embodiments, the access point can periodically, or aperiodically, communicate with the remote server to obtain updated operating parameters for the regulatory domain. For example, based on updated operating parameters, the wireless access point can determine whether new channels are available or whether power levels have changed.

In an example embodiment, the portable computing device can store a geo-location snapshot for a predefined time period. This feature can be employed for areas where geo-location signals may be unavailable, such as large buildings and/or other areas where signals are not available. For example, an application on the portable computing device can be launched in an area where the portable computing device can determine its location and regulatory domain corresponding to the location. This data can be stored for a predefined period of time enabling the portable computing device to configure any network device the portable computing devices establishes communication with after geo-location capabilities have ceased functioning.

Figure 6B:
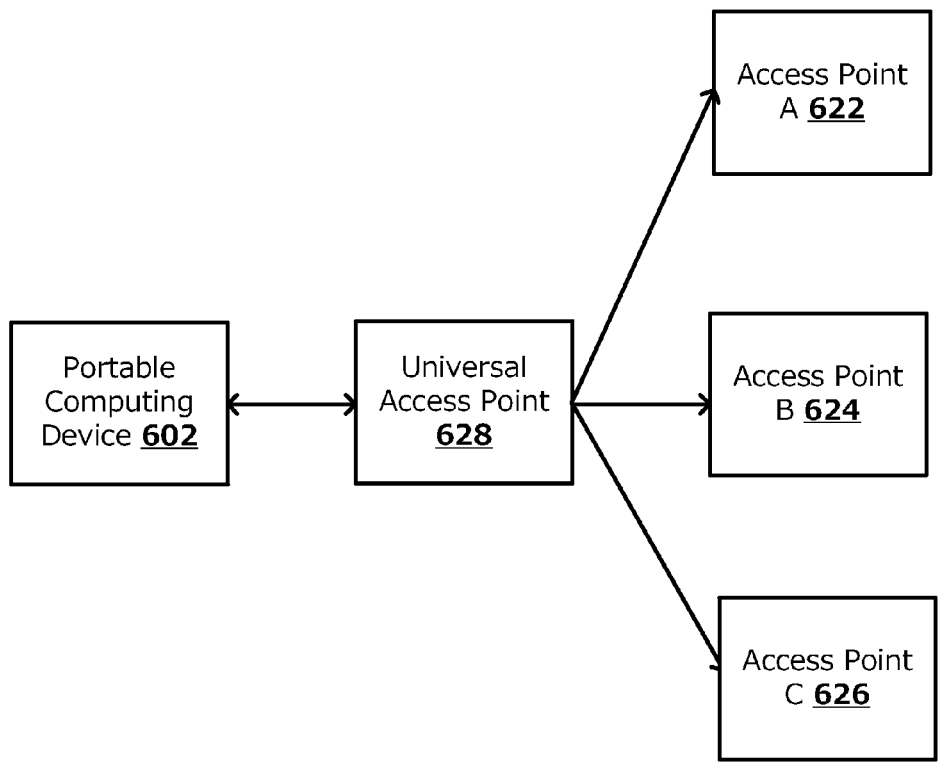

FIG. 6B illustrates an example implementation 620 where a portable computing device 602 is employed to configure at least a subset of a plurality of access points 622, 624, 626. As shown in FIG. 6B, the portable computing device can be used to configure a first access point, for example, access point 628, and the first access point 628 can be used to configure at least a subset of the plurality of access points. In this situation, although a universal access point is illustrated, any access point or wireless network device can be used in accordance with the various embodiments described herein. In various embodiments, the universal access point can be considered a "master" access point. It should be noted that any access point of the plurality of access points can be configured by the portable computing device and the configured access point can be used to provision at least a subset of the plurality of access points. It should be further noted that at least a subset of the plurality of access points are grouped or otherwise included in the same network, where a group of access points can be access points configured to operate on a same IP subnet domain, access points within a predefined range of IP addresses, or access points coupled to a common switch. In one example, an Internetwork Operating System (IOS) can verify which access points are in the same subnet. In another example embodiment, access points within a determined wireless range of the universal access point can be considered to be in the same area and/or subnet.

In the illustrated example, the portable computing device configures access point 628 and access point 628 configures at least a subset of access points 622, 624, and 626. Configuring at least a subset of access points 622, 624, and 626 can include determining, by the portable computing device, a regulatory domain corresponding to a current location, and providing the regulatory domain data as well as appropriate operating parameters to at least one access point of the plurality of access points.

In certain embodiments, the portable computing device can be used to provision at least one of the plurality of access points with regulatory domain and country configurations and each respective access point can obtain the appropriate operating parameters from a remote server. For example, as described, the portable computing device, upon determining its location, can obtain the appropriate regulatory domain corresponding to its location. The portable computing device can communicate with the universal access point (which in particular embodiments may be a "master" access point for the plurality of access points). The portable computing device can provision the universal access point with a regulatory domain and the universal access point can obtain operating parameters for the regulatory domain via at least one remote server. The universal access point can provide the regulatory domain information for at least a subset of the plurality of access points. Thereafter the subset of the plurality of access points can obtain operating parameters for the regulatory domain from at least one of the remote server, the universal access point, the portable computing device, or a combination thereof.

Figure 7:
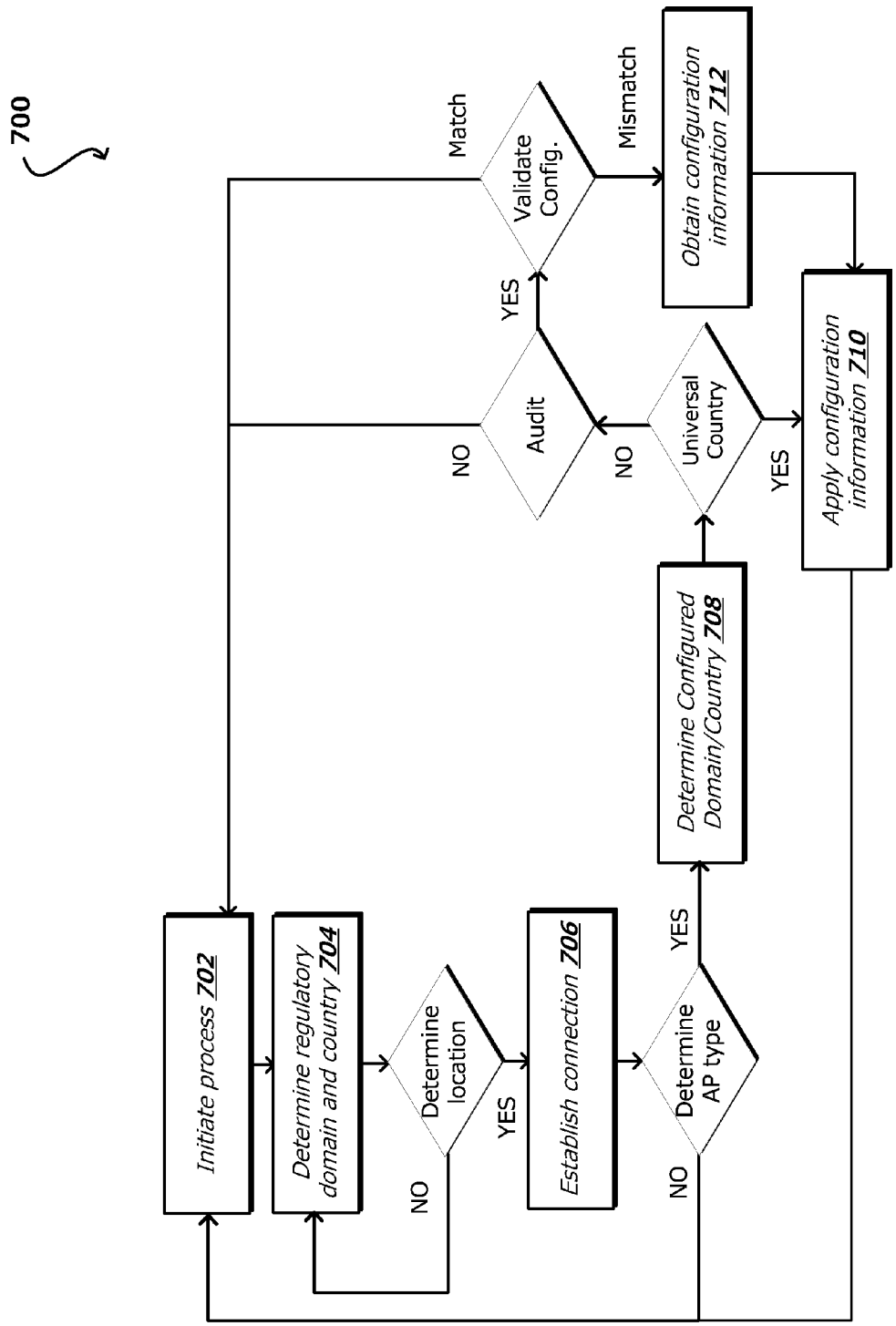
FIG. 7 illustrates an example process for network device management in accordance with various embodiments.

FIG. 7 illustrates an example process 700 for network device management in accordance with various embodiments. A portable computing device can be provided that includes at least one location determining component to determine 702 its current location, and based at least in part on the determined location, can determine or otherwise obtain 704 appropriate regulatory domain and country configuration information such that the device can be used to configure an access point or other network device to be operable in one or more country and/or regulatory domains. As described, the location can be determined by any suitable means such as a location/positioning determining component, GPS, cellular network, or derived from signals received by the device from sources with known locations. In the situation the configuration information is not determined, the device can attempt to determine the configuration information for at least a predetermined number of attempts or for a predetermined period of time. In some situations, the device can use previous location information as may be stored locally or remote from the device.

The portable computing device can attempt to communicate or otherwise establish 706 a connection with at least one access point or other network device to configure the access point to operate in a determined regulatory domain. In accordance with various embodiments, detecting an access point can include, for example, listening for beacons on a predefined channel and establishing a connection with at least one access point providing such beacons. In various embodiments, the portable computing device can communicate with the access point on at least one predefined channel (e.g., a 2.4 gigahertz (GHz) channel). Upon detecting at least one access point, the portable device authenticates with the access point. This can include, for example, any suitable means for authentication, as may include a shared secret passcode, public key/private key, certificates, etc. The portable computing device then determines a type of the access point. If the access point is locked or otherwise cannot be configured then the process fails and the start again. In the situation where it is determined that the type of access point is configurable such as in the case where it is determined that the access point is a universal access point, then the portable computing device determines 708 the regulatory domain or country to which the universal access point is configured. In the situation where the regulatory domain or country is a universal country, then the portable computing device can provision 710 the universal access point with the appropriate regulatory domain, configurations, and operating parameters as may include operating channels, maximum power, etc., for the regulatory domain. A universal country can include countries or regions that do not require some level of audit to identify regulatory domain discrepancies. In the situation where the regulatory domain or country is not a universal country then at least one audit process is implemented to determine any regulatory domain discrepancies. The audit process can include identifying any regulatory domain discrepancies using at least one other network device. In the situation where the audit process is not performed due to an error, the process starts over at step 702. In the situation where the audit process is performed, then at least one process can be initiated to validate the configuration information of the access point. This can include, for example, comparing a current configuration of the access point to the configuration of at least one other access point. In the situation where the configuration information matches at least one other configuration of a neighboring access point, then the access point resumes operating using the current configuration information. In the situation where the configuration does not match the configuration information of at least one other access point, then propagation of configuration information is enabled 712 and configuration information is obtained from at least one neighboring access point. For example, a provisioned access point (in this example a master or universal access point) can be used to configure one or more other access points.

In accordance with various other embodiments, the portable computing device can be used to provision at least one master access point and the master access point can be used to provision at least one other access point. In this situation, the portable computing device can scan for at least one other unprovisioned access point. This can include listening on a predefined channel and/or listening for a specific BSSID and/or sending a predefined signal such as a predefined probe request and waiting for a response. When an access point is identified, a determination is made whether the access point is a "master access point" capable of configuring the remaining access points in the group. If the access point is not a master access point, scanning for access points resumes. If, the access point is a master access point, then the access point is configured. The master access point can scan for at least one unprovisioned access point in a group or network of access points. In accordance with various embodiments, the access points can be considered a part of a group or network of access points where the access points can be grouped based on physical location or by some other approach such as a range of IP address, and/or an IP subnet. Provisioning the master access point can include configuring the master access point with data representative of a regulatory domain. In particular embodiments, the master access point is further provisioned with operating parameters such as channels, power levels, protocols, etc. The configured master access point then provisions the appropriate data to the remaining access points belonging to the group.

In accordance with an embodiment, one or more approaches can be implemented for initially configuring an access point. In one such approach, an application on a portable computing device can be enabled, where the portable computing device can be used to configure at least one access point to operate in a regulatory domain. In an example embodiment, the application is a controlled, secure application. In this example, the access point is operable to provision at least one neighbor access point via Over the Air Provisioning (OTAP). The application can be used to determine a location for the portable computing device, where the locations can be used with at least one map to determine the regulatory domain and configuration information. The domain and configuration information can be obtained via a webserver or obtained locally. The portable computing device can then search for one or more access points with a determined distance of the access point. In response to detecting at least one access point, a request can be communicated to the detected access point such that the portable computing device can authenticate with the detected access point. Upon successfully authenticating, the portable computing device can provide configuration data to the access point and the configuration data can be used to configure the access point.

For example, the portable computing device can push or otherwise provide one or more regulatory domain and country configuration settings to the access point. The access point can use the configuration settings to configure itself for the regulatory domain. In certain embodiments, the access point then disassociates or otherwise terminates the connection with the portable computing device. Thereafter, the access point transmits a neighbor probe or other signal to detect one other access point that has not yet been configured. For example, the access point can discover a neighboring access point employing OTAP. This can include, for example, an exchange of several messages such as a probe response, authentication messages, etc. In response to establishing a connection with the neighboring access point, the access point communicates the regulatory domain configuration data to the neighbor access point.

In certain embodiments, an access point may "wake up" or otherwise be powered on and determine that the controller and gateway have changed but the neighboring access points are the same. For example, the access point may resume from a reset or power cycle and poll the gateway of other connected network device in communication with the access point. The access point can then poll the controller also coupled with the access point. The access point can compare the values obtained for the gateway and controller with previously stored values. In response to detecting a change in the controller and/or gateway based on previously stored values, the access point can invoke OTAP to detect at least one neighboring access point to determine whether any neighboring access points have changed. If it is determined that no change has occurred from the neighboring access points, then the access point can enter a configuration mode where one of neighboring access points passes the configuration for the regulatory domain to the access point. Thereafter the access point configures itself for the regulatory domain.

In some embodiments, the access point may resume from sleep, a power off state, or other low power state and determine a new configuration is required. For example, in response to returning from a reset or power cycle, the access point polls the gateway and controller coupled with the access point to obtain the gateway and controller ID. The access point then compares the gateway and controller identifiers obtained with previously stored values. When a change in the controller and/or gateway is detected the access point invokes OTAP to communicate with at least one neighbor access point. This can include, for example, determining whether the neighbor list for neighboring access points has changed. In response to determining that the neighboring list has changed the access point enters a configuration mode. The access point can then search for one or more access points within a determined distance, and in response to detecting at least one access point, a request can be communicated to the detected access point such that the access point can authenticate with the detected access point. Upon successfully authenticating, the detected access point can provide configuration data to the access point and the configuration data can be used to configure the access point. Thereafter, the configured access point can transmit a neighbor probe or other signal to detect one other access point that has not yet been configured and in response to establishing a connection with at least one unconfigured neighboring access point, the configured access point communicates the regulatory domain configuration data to neighboring unconfigured access point.

In various embodiments, the access point may resume from a power off state, sleep state, or other low power state and can determine that the operating environment has not changed. In this situation, in response to resuming operation from a reset or power cycle, the access point polls the gateway and controller coupled with access point to obtains the gateway and controller ID. The access point is then caused to compare the values obtained from the gateway and controller with stored values. In response to determining that there was no change from the stored values, the access point configures itself using stored regulatory domain settings and resumes normal operations based at least in part on the stored regulatory domain settings.

Figure 8:
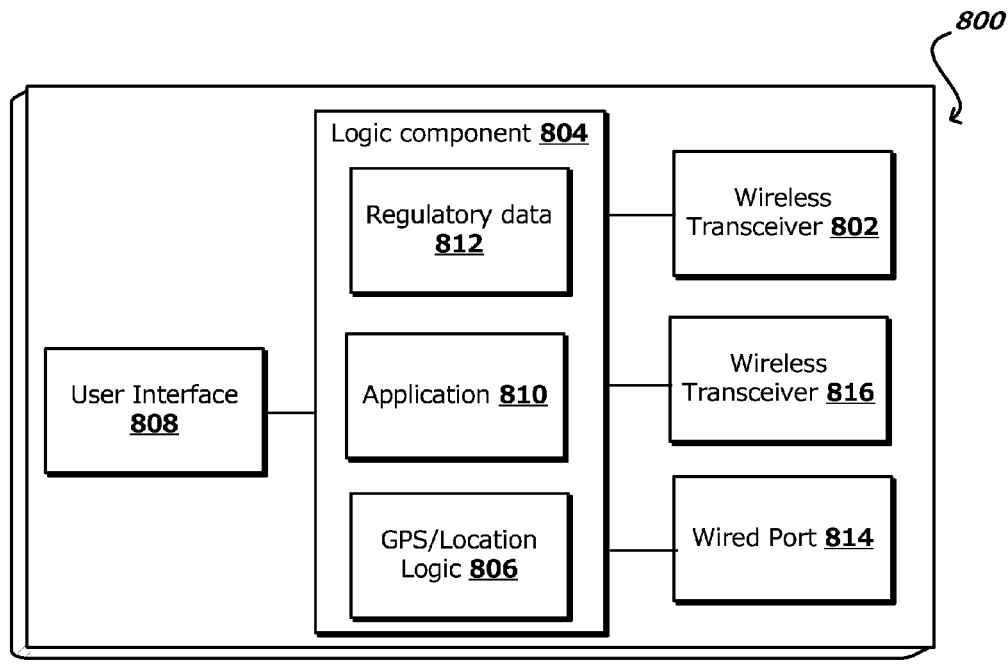
FIG. 8 is an example block diagram illustrating an example of a portable computing device in accordance with various embodiments.

FIG. 8 is a block diagram illustrating an example of a portable computing device 800 for implementing an example embodiment. Portable computing device 800 comprises a wireless transceiver 802 and a logic component 804 coupled with wireless transceiver. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions. In an example embodiment, the logic component 804 comprises regulatory data 812, an application 810, and GPS/Location logic 806, and is coupled to a user interface 808. In particular embodiments, application 810 is a controlled and secure application.

In an example embodiment, wireless transceiver 802 communicates wirelessly with a device such as an access point. Logic component 804 sends regulatory domain data 812 to the device via wireless transceiver 802. Regulatory domain data may suitably comprise data representative of the regulatory domain, and/or may include operating parameters such as channels, power levels, protocols etc. for the regulatory domain.

Logic component 804 is configured to obtain GPS or other location data from module GPS/Location logic 806. User interface 808 is employed to enable a user to launch application 810, which performs the functionality described herein. For example, application 810, which may be implemented by logic component 804, obtains GPS/location data from GPS/location logic 806 and determines a regulatory domain corresponding to the location and provides regulatory domain data 812 suitable for configuring a wireless device via wireless transceiver 802.

Optionally, wired port 814 is employed for configuring a wireless device with regulatory domain data. For example, location data is obtained via wireless transceiver 802 by logic component 804. A wired connector, such as a serial or Universal Serial Bus (USB) cable, couples wireless device 800 to the wireless device being configured. Logic 802 sends regulatory data 812 corresponding to the current location via wired port 814 to the wireless device being configured.

In an example embodiment, portable computing device 800 comprises a second wireless transceiver 816. For example, if portable computing device 800 is a mobile phone, the wireless transceiver 802 may be employed for communicating via WiFi and wireless transceiver 816 may be employed for communicating with a cellular network. GPS/Location logic 806 may obtain GPS data via wireless transceiver 816 or location data from a cellular network via transceiver 816, or data from a cellular network that GPS/location logic 806 can use to determine portable computing device's 800 current location. Logic 804 obtains regulatory domain data 812 corresponding to the current location. In particular embodiments the regulatory domain data comprise operating parameters such as channels, power levels, protocols, etc.

In other example embodiments, additional wireless transceivers may be employed, for example a first wireless transceiver for communicating with a cellular network, a second wireless transceiver for communicating with WiFi devices, and a third wireless transceiver for obtaining GPS data. In still yet another example embodiment, one wireless transceiver, e.g., wireless transceiver 802 performs a combination of functions such as cellular and GPS and/or WiFi and GPS.

Figure 9:
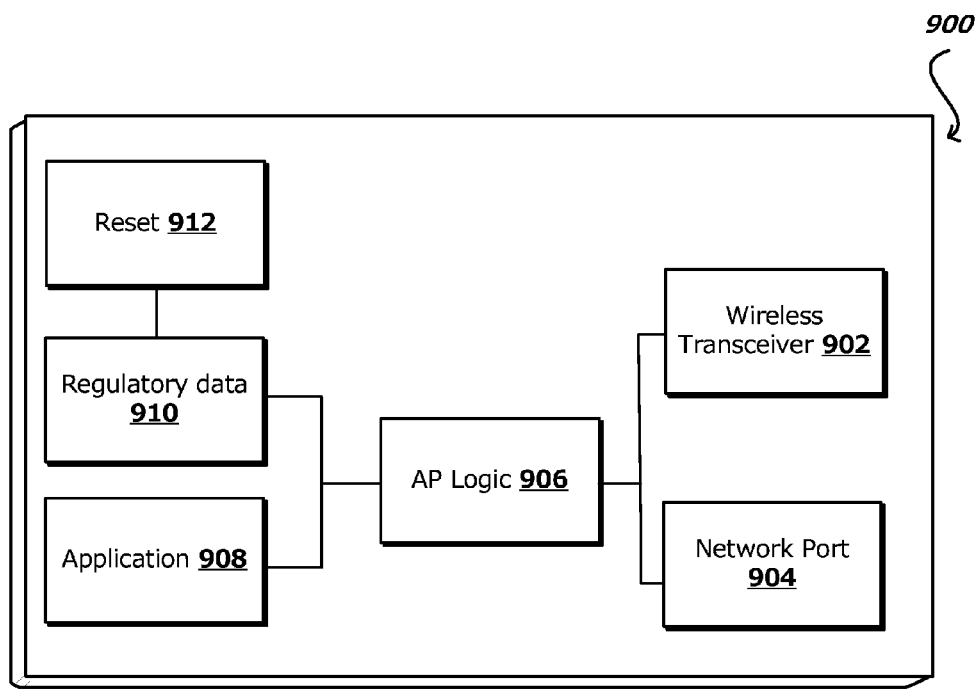
FIG. 9 is a block diagram illustrating an example of an access point upon which an example embodiment can be implemented.

FIG. 9 is a block diagram illustrating an example of an access point 900 upon which an example embodiment can be implemented. Access point (AP) 900 comprises a wireless transceiver 902, network port (which may be wired or wireless) 904 and AP logic 906 for performing the functionality described herein. In an example embodiment, AP logic 906 executes application 908 while AP 900 is not configured with regulatory domain data. In an example embodiment, a predefined signal such as a basic service set identifier (BSSID) may be broadcast via wireless transceiver 902 while AP 900 is not configured. In another example embodiment, wireless transceiver 902 may listen on a predefined channel (for example a global channel such as 2.4 GHz may be defined) for a predefined signal from a device capable of providing regulatory domain data. In an example embodiment, once application 908 receives regulatory domain data 910, application 908 stops. In particular embodiments, application 908 will not execute as long as AP 900 is configured with regulatory domain data. An aspect of this example embodiment is that it can prevent rogue devices from re-programming AP 900. A reset function 912 may be provided to clear regulator domain data 910. In an example embodiment, reset function 912 may be embodied in a switch disposed within AP 900. In other example embodiments, reset function may be embodied in logic coupled to AP logic 906. For example reset function may be configured to reset upon receiving a special code via wireless transceiver 902 and/or network port 904. In particular embodiments, the special code is received from an authenticated source.

In an example embodiment, AP 900 receives the operating parameters for regulatory domain with regulatory domain data 910 received via wireless transceiver 902. In another example embodiment, upon receiving regulatory domain data via wireless transceiver 902, AP logic 906 obtains the operating parameters for the regulatory domain via network port 904. For example, AP logic 906 may be provisioned with an address for a server to obtain the operating parameters. In particular embodiments, the server is authenticated prior to obtaining the operating parameters. The data for authenticating the server may be provided via wireless transceiver 902 or may be installed in AP logic 906 at the factory. In an example embodiment, application 908 is configured with data for authenticating the provisioning server.

In an example embodiment, upon receiving the operating parameters, wireless transceiver 902 is configured to operate employing the operating parameters. In particular embodiments, if AP 900 belongs to a group of APs, AP 900 may employ wireless transceiver 902 or network port 904 to configure the remaining members of the group.

Figure 10:
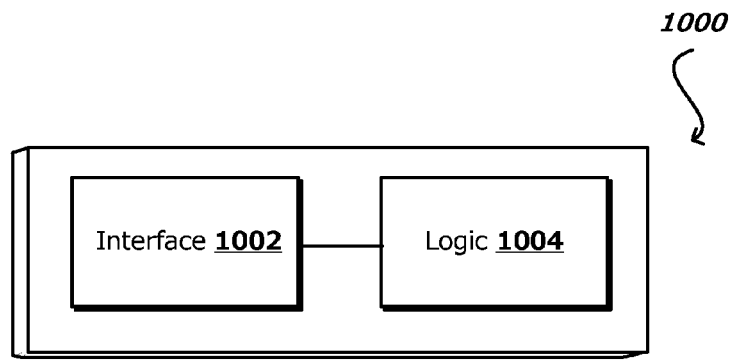
FIG. 10 is a block diagram illustrating an example of a server upon which an example embodiment can be implemented.

FIG. 10 is a block diagram illustrating an example of a server 1000 upon which an example embodiment can be implemented. Server 1000 suitably comprises an interface 1002 for communicating with external devices and logic 1004 for implementing the functionality described herein. Logic 1004 is configured to receive regulatory domain data for a device via interface 1002 and determine the operating parameters appropriate for the regulator domain. Logic 1004 may be further configured to authenticate with the device before providing the operational parameters. For example, logic 1004 may be configured with certificates, public/private keys, and/or shared secrets for authenticating devices requesting regulatory domain data.

Figure 11:
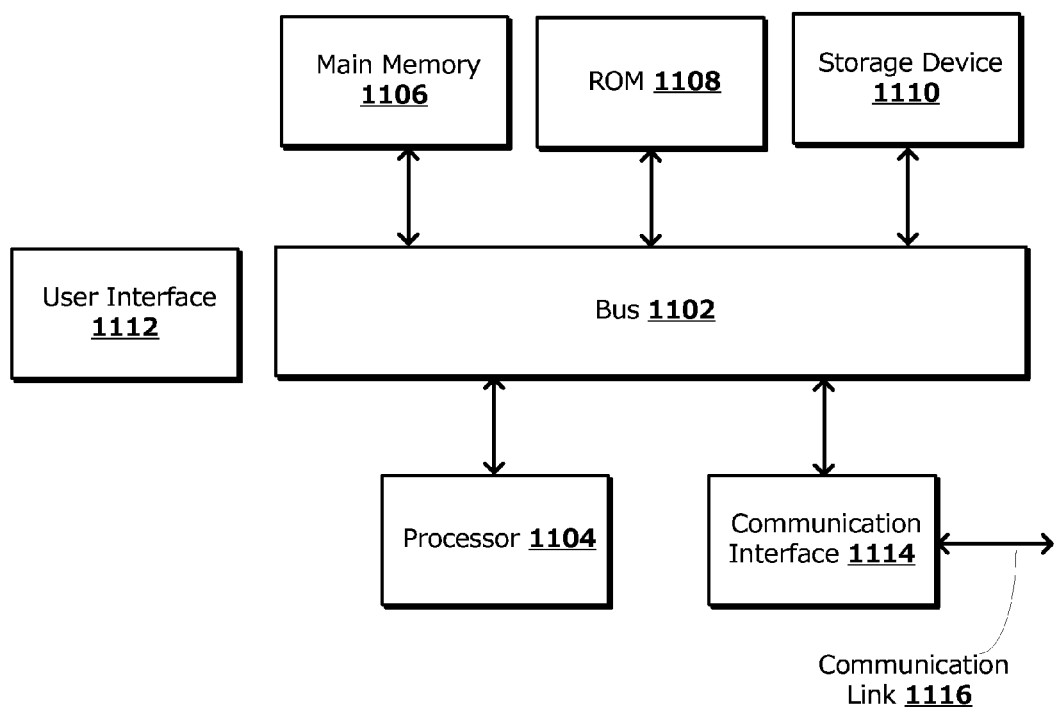
FIG. 11 is an example computer system that can be used in accordance with various embodiments.

FIG. 11 is an example computer system 1100 that can be used in accordance with various embodiments. As shown in FIG. 11, computer system 1100 includes a bus 1102 or other communication mechanism for communicating information and a processor 1104 coupled with bus 1102 for processing information. Computer system 1100 also includes a main memory 1106, such as random access memory (RAM) or other dynamic storage device coupled to bus 1102 for storing information and instructions to be executed by processor 1104. Main memory 1106 also may be used for storing a temporary variable or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a user interface 1112. User interface may suitably comprise a display such as a liquid crystal display (LCD), for displaying information to a computer user. User interface 1112 may further comprise an input device, such as a keyboard including alphanumeric and other keys, a mouse or a touchscreen coupled to bus 1102 for communicating information and command selections to processor 1104.

An aspect of the example embodiment is related to the use of computer system 1100 for initialization of regulatory configurations of unlicensed wireless devices. According to an example embodiment, initialization of regulatory configurations to unlicensed wireless devices is provided by computer system 1100 in response to processor 1104 executing one or more sequences of one or more instructions contained in main memory 1106. Such instructions may be read into main memory 1106 from another computer-readable medium, such as storage device 1110. Execution of the sequence of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1104 for execution. Such a medium may take many forms, including but not limited to non-volatile media, and volatile media. Non-volatile media include for example optical or magnetic disks, such as storage device 1110. Volatile media include dynamic memory such as main memory 1106. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 1104 for execution. For example, the instructions may initially be borne on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106 from which processor 1104 retrieves and executes the instructions. The instructions received by main memory 1106 may optionally be stored on storage device 1110 either before or after execution by processor 1104.

Computer system 1100 also includes a communication interface 1114 coupled to bus 1102. Communication interface 1114 provides a two-way data communication coupling computer system 1100 to external devices as illustrated by communications link 1116. Communication interface 1114 is suitably a wired or wireless interface appropriate for communication link 1116. In an example embodiment, a plurality of communication interfaces may be employed for communicating over one or more links. For example, a plurality of communication interfaces 1114 may be employed for wireless communications such as cellular, WiFi, and/or GPS and/or wired communications such as across a wireless local area network (LAN) or the Internet.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A network device, comprising:
   a computing device processor; and
   memory including instructions that, when executed by the computing device processor, cause the network device to:
   activate an automatic configuration mode on the network device;
   in response to activating the automatic configuration mode, detect a connection between the network device and one of a plurality of network devices, the one of the plurality of network devices being within a detection range relative to the network device;
   determine whether a specific domain associated with the network device is primed;
   upon determining that the specific domain associated with the network device is primed, determine whether a location of the network device has changed;
   upon determining at least one of (1) the specific domain associated with the network device is not primed or (2) the specific domain associated with the network device is primed and the location of the network devices has changed, determine a current regulatory domain and a current regulatory domain configuration information for the network device by identifying a new regulatory domain and applying corresponding regulatory domain configuration information to the network device;
   upon determining that the specific domain associated with the network device is primed and the location of the network device has not changed, maintain an existing regulatory domain and apply corresponding regulatory domain configuration information for the network device; and
   apply the current regulatory domain configuration information to the network device.

2. The network device of claim 1, wherein the instructions when executed further cause the network device to:
   store the current regulatory domain configuration information; and
   configure another one of the plurality of network devices using the stored regulatory domain configuration information to operate in the current regulatory domain.

3. The network device of claim 1, wherein the instructions when executed further cause the network device to:
   detect a failure of the automatic configuration mode; and
   activate a portable device configuration mode, wherein, during the portable device configuration mode, the network device is configured to receive the current regulatory domain configuration information from a portable computing device and apply the current regulatory domain configuration information to at least one of the plurality of network devices.

4. The network device of claim 1, wherein the instructions when executed further cause the network device to determine that the location of the network device has changed by:
   establishing a peer-to-peer connection with the at least one of the plurality of network devices;
   causing the at least one of the plurality of network devices to determine a current location of the network device;
   receiving the current location from the at least one of the plurality of network devices; and
   determining that the current location is different from a previous location of the network device.

5. A computer-implemented method, comprising:
   activating an automatic configuration mode on a computing device;
   in response to activating the automatic configuration mode, detecting a connection between the computing device and one of a plurality of network devices, the one of the plurality of network devices being within a detection range relative to the computing device;
   determining whether a specific domain associated with the network device is primed;
   upon determining that the specific domain associated with the network device is primed, determining whether a location of the network device has changed;
   upon determining at least one of (1) the specific domain associated with the network device is not primed or (2) the specific domain associated with the network is primed and the location of the network devices has changed, determining a current regulatory domain and a current regulatory domain configuration information for the network device by identifying a new regulatory domain and applying corresponding regulatory domain configuration information to the network device;
   upon determining that the specific domain associated with the network device is primed and the location of the network device has not changed, maintaining an existing regulatory domain and applying corresponding regulatory domain configuration information for the network device; and applying the current regulatory domain configuration information to the network device.

6. The computer-implemented method of claim 5, further comprising:

storing the current regulatory domain configuration information; and configuring the at least one of the plurality of network devices using the stored regulatory domain configuration information to operate in the at least one geographic area.

7. The computer-implemented method of claim 5, further comprising:

detecting a failure of the automatic configuration mode; and activating a portable device configuration mode, wherein, during the portable device configuration mode, the computing device is configured to receive the current regulatory domain configuration information from a portable computing device and apply the current regulatory domain configuration information to at least one of the plurality of network devices.

8. The computer-implemented method of claim 5, wherein the determining whether the location of the network device has changed, comprises:

establishing a peer-to-peer connection with the at least one of the plurality of network devices;

causing the at least one of the plurality of network devices to determine a current location of the computing device;

receiving the current location from the at least one of the plurality of network devices; and determining that the current location is different from a previous location of the computing device.

9. The computer-implemented method of claim 5, wherein the current regulatory domain configuration information includes at least one of information corresponding to available channels for a particular regulatory domain or maximum transmit power for the available channels.

10. The computer-implemented method of claim 5, further comprising:

storing the current regulatory domain configuration information;

establishing a peer-to-peer connection between the computing device and one or more of the plurality of network devices; and configuring the one or more of the plurality of network devices using the current regulatory domain configuration information.

11. The computer-implemented method of claim 5, wherein the current regulatory domain configuration information is obtained based at least in part on 802.11 beacon frames, invalid filters, or malicious rogues.

12. The computer-implemented method of claim 7, further comprising:

causing the portable computing device to acquire the current regulatory domain configuration information using a cellular networking protocol, the current regulatory domain configuration information corresponding to the regulatory domain configuration information operable to configure the computing device to operate in at least one regulatory domain.

13. The computer-implemented method of claim 7, further comprising:

causing the portable computing device to acquire the current regulatory domain configuration information using an internet protocol address of a remote server, the remote server in communication with at least one data store storing the current regulatory domain configuration information.

14. The computer-implemented method of claim 5, further comprising:

detecting a master network device from the plurality of network devices;

configuring the master network device using the current regulatory domain configuration information; and causing the master network device to configure at least one other network device of the plurality of network devices.

15. The computer-implemented method of claim 5, further comprising:

accessing at least one remote server by the computing device;

comparing a version of the current regulatory domain configuration information on the computing device to a stored version of the configuration information at the remote server;

determining that the stored version includes updated configuration information;

receiving the stored version of the configuration information by the computing device.

16. The computer-implemented method of claim 5, wherein the connection between the computing device and the one of the plurality of network devices is a secure connection.

17. A non-transitory computer readable storage medium storing one or more sequences of instructions executable by one or more processors to perform a set of operations comprising:

activating an automatic configuration mode on a computing device;

in response to activating the automatic configuration mode, detecting a connection between the computing device and one of a plurality of network devices, the one of the plurality of network devices being within a detection range relative to the computing device;

determining whether a specific domain associated with the network device is locked or primed to yield a determination;

upon determining that the specific domain associated with the network device is primed, determining whether a location of the network device has changed;

upon determining at least one of (1) the specific domain associated with the network device is not primed or (2) the specific domain associated with the network is primed and the location of the network devices has changed, determining a current regulatory domain and a current regulatory domain configuration information for the network device by identifying a new regulatory domain and applying corresponding regulatory domain configuration information to the network device;

upon determining that the specific domain associated with the network device is primed and the location of the network device has not changed, maintaining an existing regulatory domain and applying corresponding regulatory domain configuration information for the network device; and applying the current regulatory domain configuration information to the network device.

18. The non-transitory computer readable storage medium of claim 17, wherein the one or more sequences of instructions further cause the one or more processors to perform the operations of:

storing the current regulatory domain configuration information; and configuring the at least one of the plurality of network devices using the stored configuration information to operate in the at least one geographic area.

19. The non-transitory computer readable storage medium of claim 18, wherein the one or more sequences of instructions further cause the one or more processors to perform the operations of:

detecting a failure of the automatic configuration mode; and activating a portable device configuration mode, wherein, during the portable device configuration mode, the computing device is configured to receive the current regulatory domain configuration information from a portable computing device and apply the current regulatory domain configuration information to at least one of the plurality of network devices.

20. The non-transitory computer readable storage medium of claim 17, wherein the one or more sequences of instructions further causes the one or more processors to determine that the location of the network device has changed by:

establishing a peer-to-peer connection with the at least one of the plurality of network devices;

causing the at least one of the plurality of network devices to determine a current location of the computing device;

receiving the current location from the at least one of the plurality of network devices; and determining that the current location is different from a previous location of the computing device.

* * * * *